US008474407B2

(12) United States Patent
Chumbley

(10) Patent No.: US 8,474,407 B2
(45) Date of Patent: Jul. 2, 2013

(54) POULTRY WATERING SYSTEM AND METHOD

(76) Inventor: Philip E. Chumbley, Aurora, IL (US)

( * ) Notice: Subject to any disclaimer, the term of this patent is extended or adjusted under 35 U.S.C. 154(b) by 121 days.

(21) Appl. No.: 12/961,725

(22) Filed: Dec. 7, 2010

(65) Prior Publication Data

US 2011/0139080 A1 Jun. 16, 2011

Related U.S. Application Data

(60) Provisional application No. 61/285,880, filed on Dec. 11, 2009.

(51) Int. Cl.
*A01K 7/00* (2006.01)
(52) U.S. Cl.
USPC ............................................................ 119/77
(58) Field of Classification Search
USPC .................... 119/72, 74, 77; 137/1, 561 R
See application file for complete search history.

(56) References Cited

U.S. PATENT DOCUMENTS

| 405,369 | A | | 6/1889 | Merriman | |
|---|---|---|---|---|---|
| 769,942 | A | | 9/1904 | Elsold | |
| 854,615 | A | * | 5/1907 | Vorheis et al. | 119/77 |
| 1,073,195 | A | | 9/1913 | Weller | |
| 1,343,010 | A | * | 6/1920 | Schell | 119/73 |
| 1,358,245 | A | | 11/1920 | Pruden | |
| 1,438,770 | A | | 12/1922 | Long | |
| 1,458,450 | A | * | 6/1923 | Unger et al. | 119/73 |
| 1,557,502 | A | | 10/1925 | Ryon | |
| 1,643,245 | A | * | 9/1927 | Jevons | 119/73 |
| 1,673,814 | A | | 6/1928 | Edington | |
| 1,787,015 | A | * | 12/1930 | Mueller | 119/77 |
| 1,828,048 | A | | 10/1931 | Jevons | |
| 1,881,838 | A | * | 10/1932 | Mohr | 119/73 |
| 2,530,597 | A | | 11/1950 | Opal | |
| 2,623,500 | A | * | 12/1952 | Riley et al. | 119/78 |
| 2,671,430 | A | | 3/1954 | Miller | |
| 2,687,115 | A | * | 8/1954 | Andrews | 119/77 |
| 3,170,439 | A | | 2/1965 | Juenger | |
| 3,221,706 | A | * | 12/1965 | Johnson | 119/73 |
| 3,292,580 | A | * | 12/1966 | Merritt, Sr. et al. | 119/14.46 |
| 3,384,109 | A | * | 5/1968 | Stroburg et al. | 137/434 |
| 4,259,975 | A | * | 4/1981 | Kinsey et al. | 137/1 |
| 4,293,964 | A | * | 10/1981 | Riedel | 4/378 |
| 5,682,836 | A | | 11/1997 | Gustin | |
| 5,711,248 | A | * | 1/1998 | Boyd | 119/77 |
| 5,829,386 | A | * | 11/1998 | Wenstrand | 119/77 |
| 5,845,605 | A | * | 12/1998 | Malamphy | 119/69.5 |
| 7,735,455 | B2 | | 6/2010 | Clark | |
| 7,861,671 | B2 | | 1/2011 | Carter et al. | |
| 8,011,324 | B1 | * | 9/2011 | Warganich | 119/77 |
| 8,146,535 | B1 | | 4/2012 | Neumann | |

(Continued)

*Primary Examiner* — Rob Swiatek
*Assistant Examiner* — Ebony Evans
(74) *Attorney, Agent, or Firm* — Joseph M. Butscher; The Small Patent Law Group, LLC

(57) ABSTRACT

A top-filling watering system configured to provide water to livestock, includes a water basin having an upstanding wall, and a reservoir securely mounted to the water basin. The reservoir includes a top wall integrally formed with a circumferential wall defining an open end connected to an interior cavity defined between the top wall and the circumferential wall. A filling opening is formed through the top wall. The filling opening is configured to allow water to be filled into the interior cavity. Another reservoir is capable of nesting within the interior cavity when the reservoir is not securely mounted to the water basin.

28 Claims, 3 Drawing Sheets

U.S. PATENT DOCUMENTS

2007/0277738 A1   12/2007   Dentsbier
2008/0245308 A1   10/2008   Clark
2010/0199918 A1   8/2010   Reusche
2010/0206237 A1   8/2010   Reusche

* cited by examiner

POULTRY WATERING SYSTEM AND METHOD

RELATED APPLICATIONS

The present application relates to and claims priority from U.S. Provisional Application No. 61/285,880, entitled "Top-Filling Poultry Drinker," filed Dec. 11, 2009, which is hereby incorporated by reference in its entirety.

FIELD OF THE INVENTION

Embodiments of the present invention generally relate to a system and method for providing water to livestock, such as poultry, and more particularly, to top-filling gravity-fed watering systems and methods.

BACKGROUND OF THE INVENTION

Gravity-fed watering devices have been used for a number of years in order to provide water for livestock, such as chickens, to drink. In general, the watering device includes a basin having a low wall that defines a drinking trough. A metal or plastic water reservoir is mounted above the basin.

In use, the reservoir is positioned on the basin such that an open end is downwardly-oriented, akin to a bucket that is turned upside down. In order to fill the watering device, the reservoir is detached from the basin. The reservoir is then inverted so that its open end is exposed. Water may then be filled into the reservoir, which then retains the water. After the reservoir is filled, the basin is reattached to the reservoir, and the device is tipped over, such that the basin is upwardly-oriented and the reservoir is downwardly-oriented. In this orientation, the outer circumferential wall of the basin overhangs the reservoir, as the diameter of the basin exceeds that of the reservoir.

FIG. 1 illustrates a cross-sectional view of a conventional watering device 10. The device 10 includes a basin 12 having a base 14 integrally formed with an outer wall 16 defining a water-retaining volume therebetween. The device 10 also includes a reservoir 18 having a base 20 integrally formed with circumferential walls 22. An open end of the reservoir leads to a cavity 24 configured to receive and retain water 26.

As shown in FIG. 1, the device 10 is in an operational configuration such that the reservoir 18 is attached to the basin 12. As noted above, the outer wall 16 of the basin 12 overhangs an outer circumference of the reservoir 18.

The edges of the walls 22 of the reservoir 18 attach to the basin 12 at a level that is lower than the upper edges of the outer wall 16 of the basin 12. Accordingly, a drinking trough 28 is defined between the outer wall 16 and the edges of the walls 22.

A channel or notch may be formed proximate the edge of the walls 22 of the reservoir 18. The channel allows water to flow by force of gravity from the reservoir 18 into the trough 28. As water flows out of the reservoir 18, it is replaced by air that bubbles past the edge and collects in a space 29 above the water 26 contained within the reservoir 18.

As the water level in the trough 28 rises, however, the edge of the reservoir 18 becomes submerged, and backward flow of air into the reservoir 18 stops. At this point, water continues to flow, thereby expanding the volume of the space 29 trapped inside the reservoir 18. However, because air is no longer flowing into the volume of the space 29, air pressure therein decreases. Water continues to flow from the reservoir 18 into the trough 28 until the weight of the water 26 inside the reservoir 18 plus the pressure of the trapped air is balanced by ambient air pressure outside the reservoir 18.

The flow of water from the reservoir 18 into the trough continues to rise until it reaches the lower edge of the reservoir 18. At this point, the water seals off the path that previously allowed air to enter. As water then continues to flow from the reservoir 18, it is not replaced by air, but, instead, a partial vacuum is formed above the water in the space 29. Water continues to flow until the pressure from the water and air inside the reservoir 18 equals the pressure from the water and air outside the reservoir 18, as described in the following equation:

$$p_r + p_{wr} = p_d + p_{wd}$$

where $p_r$ is the air pressure above the water inside the reservoir 18, $p_{wr}$ is the water pressure inside the reservoir 18, $p_d$ is the air pressure above the drinking trough 28, and $p_{wd}$ is the water pressure in the drinking trough 28.

The water pressures may also be represented by $\rho A h$, where $\rho$ is the water density, A is a unit area, and h is the height of the water. Therefore, using the above equation:

$$p_r + \rho A h_{wr} = p_d + \rho A h_{wd}$$

From this equation, it is seen that as a volume of reduced air pressure $p_r$ forms in the reservoir, the height $h_{wr}$ of water supported in the reservoir 18 can be significantly larger than the height $h_{wd}$ of water in the drinking trough 28. For a typical poultry watering device with a reservoir 15 inches tall, this equilibrium state occurs when the water in the drinking tough has risen less than 0.1 inches above the point where it prevents air from entering the reservoir.

The key to this operation is that the reservoir 18 is air tight. If, for example, a leak was to develop in the reservoir 18 which allowed air to enter, the air pressure inside the reservoir 18 would equal the air pressure outside the reservoir 18, so, using the equation above, $p_r = p_d$. Thus, all the water would run out of the reservoir 18 until $h_{wr} = h_{wd}$. By maintaining an air-tight reservoir 18, water is retained therein. Then, as chickens consume water in the drinking trough 28, the water level drops until the edge of the reservoir 18 is exposed. Air can then enter the reservoir 18, thereby allowing more water to flow into the trough 28 which, in turn, again submerges the edge of the reservoir 18 to stop the process. While this method of providing water is simple and efficient, it is not conducive for replenishing water within the reservoir 18.

As discussed above, the reservoir 18 is typically detached and inverted for filling. Then the basin 12 is reattached to the reservoir 18, and the entire device 10 is turned right-side-up, spilling water in the process.

Some devices, however, maintain connection between the basin and the reservoir at all times and fill through a valve in the basin. However, such devices still must be turned back over after filling, resulting in spillage.

To alleviate these drawbacks, certain devices have been configured to allow for filling of the reservoir from the top. A typical top-filling device includes a reservoir in the shape of a jug or tank having an air-tight lid and a small hole in the bottom of the jug to allow water to flow into the drinking trough.

FIG. 2 illustrates a cross-sectional view of a conventional top-filling watering device 30. The device 30 includes a jug or tank 32 positioned within a basin 34. The tank 32 includes an opening 36 near its bottom that allows water to flow from the tank 32 into the basin 34. In order to re-fill the tank 32, an air-tight lid 38 is removed. For example, the lid 38 may be unscrewed from the top of the tank 32. Before the lid 38 is unscrewed, however, a small cover or cap is placed over the opening 36. The lid 38 is then removed and the tank 32 is filled with water. Once re-filled to a desired level, the lid 38 is securely replaced on the tank 32, and the cover or cap is removed from the opening 36.

Thus, in order to fill the tank 32, there are a number of distinct steps. First, the small cover or cap is located and then positioned on or in the opening 36. The lid 38 is then removed from the tank 32. Water is then poured into the tank 32. After water is poured to a desired level, the lid 38 is secured back on the tank 32. The cap or cover on the opening 36 is then removed. Moreover, during this process, a user typically sticks his/her fingers into the drinking trough to either cover or uncover the opening 36 before and after filling.

Additionally, the lid 38 typically includes a gasket or O-ring configured to seal around an inlet neck of the tank 32. However, over time, the gasket or O-ring typically dries out and leaks. Continual opening and closing of the lid 38 wears on the gaskets and contributes to leaks. Such leaks may cause water to overflow from the tank 32 into the basin 34.

Further, during the filling process, the lid 38 is completely removed from the tank 32. In general, however, a typical livestock area, such as a poultry barn, does not generally, include many clean areas in which to set the lid 38. Therefore, an operator generally holds onto the lid 38 or risks getting it dirty, which could contaminate the drinking water.

Also, because the tank 32 is formed as a large jug-like structure, it is not amenable to nesting with other tanks during shipping. Accordingly, shipping costs for typical top-filling watering devices are generally higher than other watering devices, such as shown in FIG. 1.

SUMMARY OF THE INVENTION

Certain embodiments of the present invention provide a top-filling watering system configured to provide water to livestock. The system includes a water basing having an upstanding wall, and a reservoir securely mounted to the water basin.

The reservoir includes a top wall integrally formed with a circumferential wall defining an open end connected to an interior cavity defined between the top wall and the circumferential wall. A filling opening is formed through the top wall. The filling opening is configured to allow water to be filled into the interior cavity. Another reservoir is capable of nesting within the interior cavity when the reservoir is not securely mounted to the water basin.

In at least one embodiment, the reservoir is not a closed tank or a jug having a removable lid.

The system may also include a filling tube having an upper end connected to the filling opening, and a bottom end extending into the internal cavity below a level of a top lip of the upstanding wall.

A water passage or channel is formed proximate a lower edge of the circumferential wall. The system may also include a water valve configured to selectively open and close the water passage or channel. The water valve closes the water passage or channel during a filling operation, and opens the water passage or channel at times other than the filling operation. The water valve may be a flapper valve. The water valve may be operatively connected to a link that, in turn, connects to a hinged cover positioned over the filling opening.

The system may also include an air valve positioned on or proximate the top wall of the reservoir. The air valve may include a tube that connects to a water passage or channel formed through the circumferential wall.

The system may also include a dust cover positioned over the filling opening. The dust cover is configured to be moved between an open position in which the filling opening is exposed, and a closed position in which the filling opening is covered.

Figure 1:
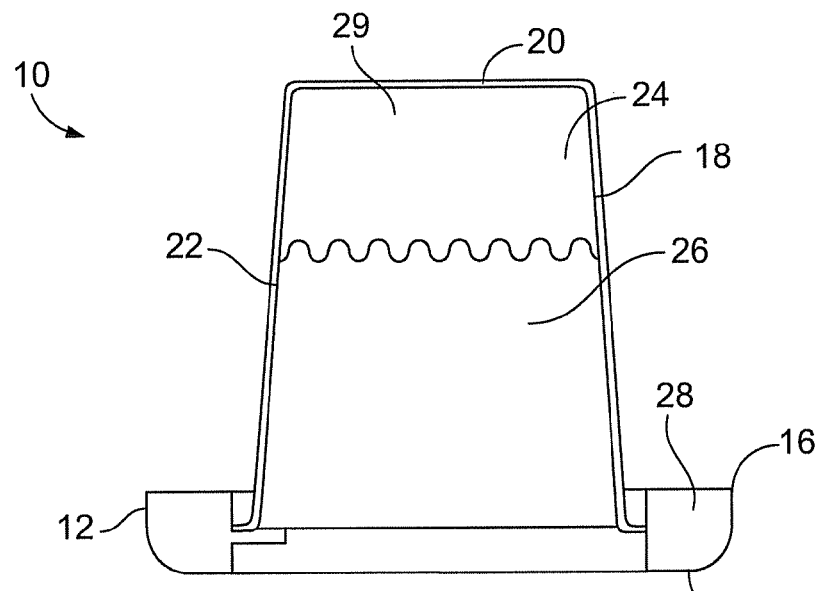
FIG. 1 illustrates a cross-sectional view of a conventional watering device.

The foregoing summary, as well as the following detailed description of certain embodiments of the present invention, will be better understood when read in conjunction with the appended drawings. For the purpose of illustrating the invention, there are shown in the drawings, certain embodiments. It should be understood, however, that the present invention is not limited to the arrangements and instrumentalities shown in the attached drawings.

DETAILED DESCRIPTION OF THE INVENTION

Figure 3:
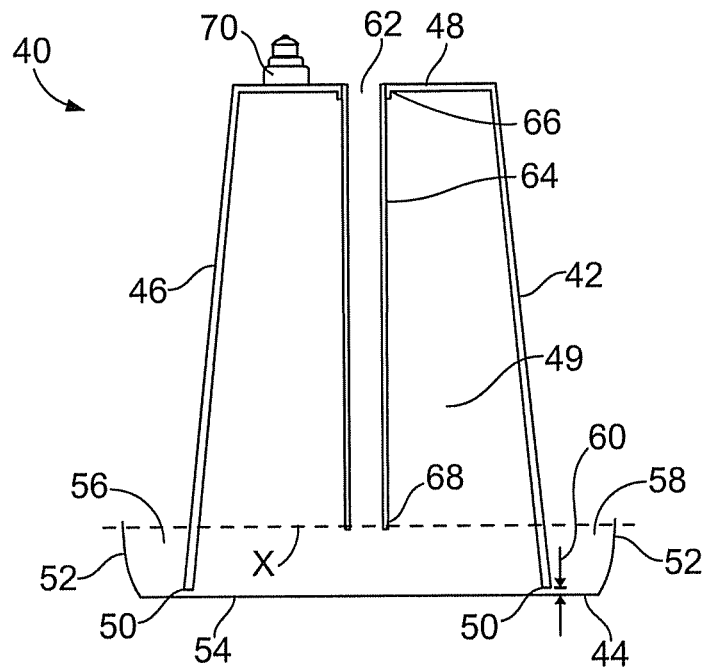
FIG. 3 illustrates a transverse cross-sectional view of a watering device, according to an embodiment of the present invention.

FIG. 3 illustrates a transverse cross-sectional view of a watering device 40, according to an embodiment of the present invention. The watering device 40 includes a reservoir 42 secured to a basin 44.

The reservoir 42 may be in the shape of a cylinder or a truncated cone and includes circumferential walls 46 integrally connected to a base 48. A cavity 49 is defined between the walls 46 and the base 48. Terminal edges 50 of the walls 46 securely fasten to the basin 44.

Figure 2:
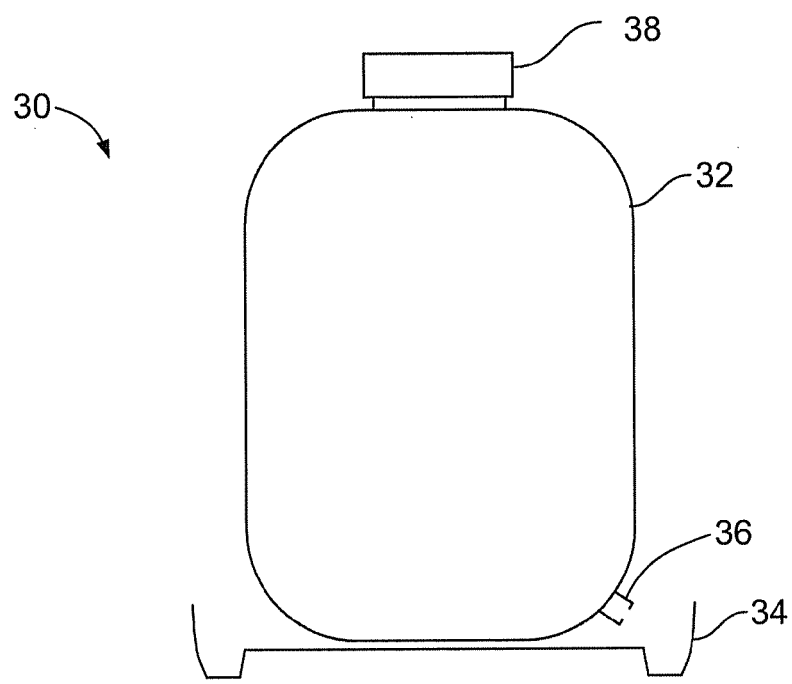
FIG. 2 illustrates a cross-sectional view of a conventional top-filling watering device.

Unlike conventional top-filling designs, the reservoir 42 has an open end defined by the terminal edges 50 that allows another reservoir 42 to nest within the cavity 49. As shown in FIG. 2, for example, a tank 32 of the conventional top-filling device 30 is incapable of allowing another tank 32 to nest therein, as the bottom of one tank would be incapable of passing into the opening covered by the lid 38.

Referring again to FIG. 3, the basin 44 includes upstanding walls 52 integrally connected to a base 54 that defines a water retention cavity 56 therebetween. The diameter of the base 54 is greater than the diameter of the reservoir 42, so that the reservoir 42 may fit within the cavity 56. Thus, a drinking trough 58 is defined between outer surfaces of the walls 46 of the reservoir 42 and inner surfaces of the walls 52 of the basin 44.

The reservoir 42 may be removably secured to the base 54 of the basin 44. For example, the terminal edges 50 may include threaded interfaces that threadably secure to or within a reciprocal interface formed in the base 54. A gasket or O-ring may be positioned between the terminal edges 50 and the connecting interface of the basin 44 to form a water-tight seal.

Optionally, the terminal edges 50 may be bonded to the base 54. Also, alternatively, the reservoir 42 and the basin 44 may be integrally formed as a single unit such that the reservoir 42 is permanently secured to the basin 44.

A water passage 60 is formed through the reservoir 44 proximate the terminal edge 50. Optionally, the water passage 60 may be a channel formed underneath an edge 50. The reservoir 42 may include more than one water passage 60. The water passage 60 allows water to pass from the reservoir 42 into the trough 58. As shown, the water passage 60 is below the top edges of the walls 52 of the basin 44. While not shown in FIG. 3, a water valve, such as a flapper valve, may be operatively connected to the reservoir 42 proximate the water passage 60 so that the water passage 60 is closed during a filling operation, but opened during normal operation.

The base 48 of the reservoir 42 includes an opening 62 formed therethrough. The opening 62 may be formed through an axial center of the base 48. An open-ended fill tube 64 connects to the opening 62 and extends down into the cavity 49. A top end 66 of the fill tube 64 securely connects to the opening 62 in an air-tight fashion. For example, the top end 66 of the fill tube 64 may be threadably secured to an interface defining the opening 62, and sealing gaskets and/or O-rings may be disposed between and about the connecting interfaces. Optionally, the fill tube 64 may be integrally formed with the base 48 such that it is permanently secured within the opening 62. In any event, the fill tube 64 may be configured to remain secured to the reservoir 44 at all times.

The opening 62 may be connected to a funnel that extends above the base 48 and into the fill tube 64, in order to allow water to be freely and easily poured into the fill tube 64. Additionally, a dust cover or flap may cover the opening 62. For example, a dust cover may have a portion secured to the base 48 and a free end that covers the opening 62. During a filling operation, the free end is manipulated to expose the opening 62. After filling, the free end is placed back so that the cover prevents dust, debris, and the like from passing into the opening 62.

A bottom end 68 of the fill tube 64 extends into the cavity 49 to a level x that is below the top edges of the walls 52 of the basin 44. The bottom end 68 is positioned at level x that is at, or lower than, the desired level of water within the trough 58. For example, the level x may be 0.1-0.5 inches below the upper lip or edges of the walls 52 of the basin 44.

The water level in the drinking trough 58 is defined by the highest point at which air can bubble into the reservoir 42. In previous gravity-fed poultry drinkers, such as shown in FIGS. 1 and 2, that point is the upper edge of the opening between the reservoir and the drinking trough. For the majority of those drinkers, such as shown in FIGS. 1 and 2, the opening between the reservoir and the drinking trough is formed by a notch in the lower edge of the reservoir, or by a channel that passes under the edge of the reservoir. Because the opening is located at the edge of the reservoir, in order to provide a water depth of approximately 2 inches in the drinking trough, the reservoir must be raised above the bottom of the drinking trough to the required height.

However, in embodiments of the present invention, such as shown in FIG. 3, either the upper edge of the opening between the reservoir 42 and the drinking trough 58 or the bottom end 68 of the fill tube 64, whichever is higher, determines the water level in the drinking trough 58. Thus, the bottom end 68 of the fill tube 64 may be used to define the water level and the water passage, such as the opening 62, may be positioned anywhere below the bottom end 68 of the fill tube 64. Conversely, if the water passage from the reservoir 42 to the drinking trough 58 is used to define the water level in the trough 58, the fill tube 64 may exit at any point below that level.

Because the bottom end 68 of the fill tube 64 may be used to determine the water level in the drinking trough 58, the water level in the trough 58 is not reliant upon the positioning of the water passage 60 from the reservoir 42. Therefore, the water passage 60 may be placed at any point at, or below, the desired water level in the drinking trough 58. In one embodiment, the water passage 60 is a hole in the wall 46 of the reservoir 42. In another embodiment, the passage 60 is positioned at the lower edge of the reservoir 42. The passage 60 may also be a channel that passes under the lower edges 50 of the reservoir 42. A water valve may be situated at the passage 60 to control the flow of water from the reservoir 42 to the drinking trough 58. The water valve is closed during filling of the reservoir and opened for normal operation.

Freeing the water passage 60 from use as the entry point for air to bubble into the reservoir 42 during operation also allows the use of a filter to cover the water passage 60 between the reservoir 42 and the drinking trough 58 to prevent contaminants from back-flowing into the reservoir 42. In previous devices, incorporation of a filter at this point would hinder operation because the surface tension of the water formed at the filter can prevent air from bubbling into the reservoir 42 as required for proper operation. On the other hand, by positioning the water passage 60, and hence the filter, at a point where it is always submerged, such as in embodiments of the present invention, the problem of water surface tension hindering air flow is alleviated.

As shown in FIG. 3, the device 40 may also include an air valve 70 positioned atop the base 48 of the reservoir 42. The air valve 70 is configured to release air from the reservoir 42 during filling. In its simplest form, the air valve 70 may be a threaded cap that is removed during filling to allow air to escape. That is, the valve 70 may be a threaded cap threadably secured into a hole formed in the base 48.

In another embodiment, the valve 70 may be a "pop-up" type valve, similar to those found on various sport drinks, that allows easy opening and closing. The valve 70 may also be a one-way check valve that allows air to escape from the reservoir 42 but does not allow air to enter. In general, any of these valves may be mounted to a threaded post positioned atop the base 48 of the reservoir 42 such that, in the event of the valve failing, the faulty valve may simply be unscrewed and replaced with a new valve.

During operation, the device 40 operates similar to a typical, gravity-fed poultry drinker. The reservoir 42 defines an air-tight volume positioned above the drinking trough 58. Because both the drinking trough 58 and the fill tube 64 are exposed to ambient air pressure, the water level in the fill tube 64 is generally equal with the water level in the drinking trough 58. As water is consumed in the drinking trough 58, the water level in both the drinking trough 58 and the fill tube 64 drops until air can enter at either point. When air enters, water is released from the reservoir 42 into both the drinking trough 58 and the fill tube 64 to submerge the point where air entered, thereby stopping water flow.

During filling, however, the device 40 operates quite differently than typical top-fill poultry drinkers. In one embodiment, a dust cover is raised to expose the opening 62 in the top of the reservoir 42 for filling. The action of raising the dust cover may also close a water valve between the reservoir 42 and the drinking trough 58, as explained below with respect to FIG. 4. The air valve 70 atop the reservoir 42 can then be opened. The action of opening the air valve 70 may also be linked to the action of raising the dust cover or opening the water valve.

With the air valve 70 opened and the water valve between the reservoir and the drinking trough closed, air may now enter the reservoir 42 but water will not flow into the drinking trough 58 because the path from the reservoir 42 to the drinking trough 58 is closed, such as by the water valve. Water rises, however, in the fill tube 64 to a height equal to the water level in the reservoir 42 because both the reservoir 42 and the fill tube 64 are now exposed to ambient air pressure. In the embodiments where a one-way valve is used as the air valve 70, the water level in the fill tube 64 does not change so air cannot enter the reservoir 42.

Water may now be poured into the fill tube 64. As the water level in the fill tube 64 rises above the level in the reservoir 42, water flows from the fill tube 64 into the reservoir 42 and forces air out through the air valve 70. In this manner, the reservoir 42 is replenished with water. Once the reservoir 42 is full, the air valve 70 atop the reservoir 42 is closed. At this point, the water is trapped within the air-tight reservoir 42. The water valve from the reservoir 42 to the drinking trough 58 may then be reopened and normal operation resumed.

When the water valve is reopened, there will typically be a volume of water contained within the fill tube 64. Since the fill tube 64 is exposed to ambient air just as the drinking trough 58 is, the water in the fill tube 64 will drain through the reservoir 42 into the drinking trough 58. This water could potentially overflow the drinking trough 58, but by providing extra capacity within the trough 58—by slightly increasing the height of the wall 52 of the basin 44 above the normal water level—the excess water from the fill tube 64 can be easily accommodated.

In an embodiment where a one-way valve is employed as the air valve 70, water may be poured into the fill tube 64 at any time after the water valve is closed. As the water level rises in the reservoir 42, excess air is forced out through the one-way valve. Once the reservoir 42 is filled, the water valve simply needs to be opened to resume normal operation.

The fill tube 64 may include a rigid tube that opens through the top of the reservoir 42 through an air-tight connection. However, the fill tube 64 is not required to be rigid and may be flexible as long as the bottom end 68 is at, or below, the desired water level in the drinking trough 58. In this manner, the fill tube 64 may be coiled for shipping.

The upper opening of the fill tube 64 may be configured to mate with a quick-connect attachment for a water hose for faster replenishment of the reservoir 42 without spilling water. In this configuration, one side of a quick-connect fitting may be securely mounted at the upper opening of the fill tube 64 in a water-tight connection. The fitting is then configured to mate with an end of a garden hose or flexible tubing that is attached to a water source. The fitting on the garden hose may also include a valve for controlling water flow. An operator would then close the water valve between the reservoir 42 and the drinking trough 58—although this action would not be necessary for an embodiment that includes a flapper or self-closing valve—and attach the supply hose to the fill tube 64 through the quick-connect fitting. This method of filling is possible because the fill tube 64 does not require a lid or sealing cover and, instead, can allow the mounting of a fitting to mate with a supply hose.

Figure 4:
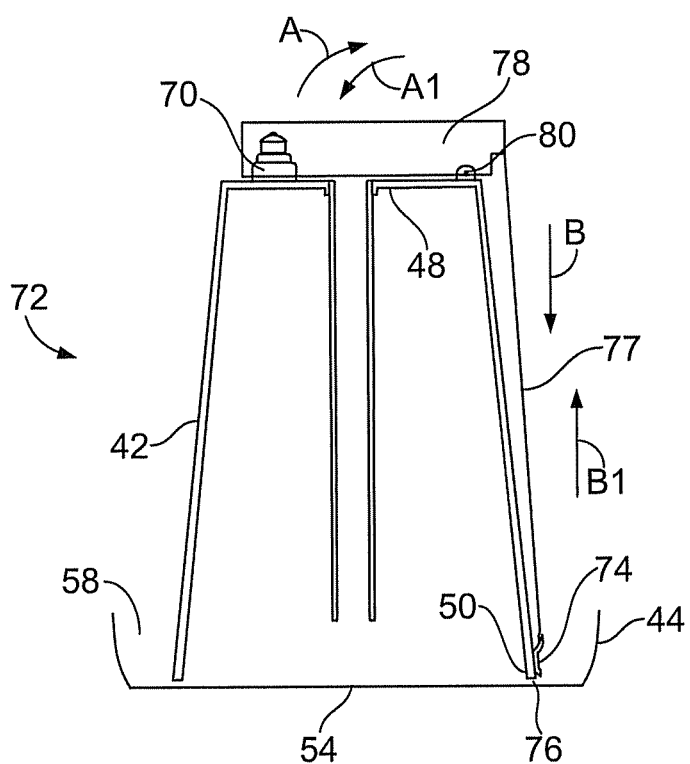
FIG. 4 illustrates a transverse cross-sectional view of a watering device, according to an embodiment of the present invention.

FIG. 4 illustrates a transverse cross-sectional view of a watering device 72, according to an embodiment of the present invention. The device 72 is similar to the device 40 shown and described with respect to FIG. 3. However, the device 42 shows a water valve 74 proximate a channel 76 between the terminal edge 50 of the reservoir 42 and the base 54 of the basin 44. The water valve 42 operatively connects to a link 77, which, in turn, operatively connects to a dust cover 78 that connects to the base 48 of the reservoir 42 through a hinge 80.

In operation, the free end of the dust cover 78 is manipulated and pivoted upward in the direction of arc A about the hinge 80. During this movement, the link 77 moves downward in the direction of line B in response. As the link 77 moves downward, the water valve 74 moves downward in the direction of arrow B to cover the channel 76. Thus, during filling, when the dust cover 78 is opened, the water valve 74 covers the channel 76 or opening. The water valve 74 and link 77 may be configured to operatively cover and uncover an opening, such as the opening 62 shown in FIG. 3, in a like manner.

After the filling operation, the dust cover 78 is pivoted back to a covering position in the direction of arc A'. Therefore, the link 77 moves up in the direction of arrow B', and, in response, the water valve 74 also moves in the same direction, thereby uncovering the channel 76.

Alternatively, the water valve 74 may not be linked to the dust cover 78, but may be configured to close when the volume of water flowing from the reservoir 42 into the drinking trough 58 exceeds a certain threshold. For example, the in-rush of water during the filling process may be used to close a flapper valve. In that situation, the water valve 74 remains closed until the pressures on both sides of the water valve 74 are nearly equal. To achieve this equilibrium state, the water valve 74 may include a small opening that allows a slow leak through the water valve 74 or between the reservoir 42 and drinking trough 58.

The purpose of a water valve, such as the water valve 74, between the reservoir 42 and the drinking trough 58, is to prevent water from gushing out and overflowing the drinking trough 58 during the time that the reservoir 42 is opened to ambient air for filling. However, it is not necessary to prevent all water from flowing between the reservoir 42 and the drinking trough 58 during filling as long as the amount of water that flows into the drinking trough 58 during that time does not overflow. For instance, if it takes one minute to fill the reservoir 42 with water and the maximum water flow from the reservoir to the drinking trough 58 is 0.1 gallon per minute and the drinking trough 58 can accommodate the extra 0.1 gallon without overflowing, then there is no need to close a water valve between the reservoir 42 and the drinking trough 58. Thus, an alternative to the water valve is to size the water passage, such as the water passage 60, shown in FIG. 3, or channel 76, such as shown in FIG. 4, formed through the reservoir 42 such that it restricts the flow to an acceptable level. This can be accomplished by restricting the size of the opening 62 or channel 76 between the reservoir 42 and the drinking trough 58, or by using a porous or semi-permeable substance in the passage 60 or channel 76 such that the flow rate between the reservoir 42 and the drinking trough 58 is reduced. Another method is to not provide a gasket under the lower edge of the reservoir 42 so that water flow to the drinking trough 58 occurs through natural leakage under the edge.

Figure 5:
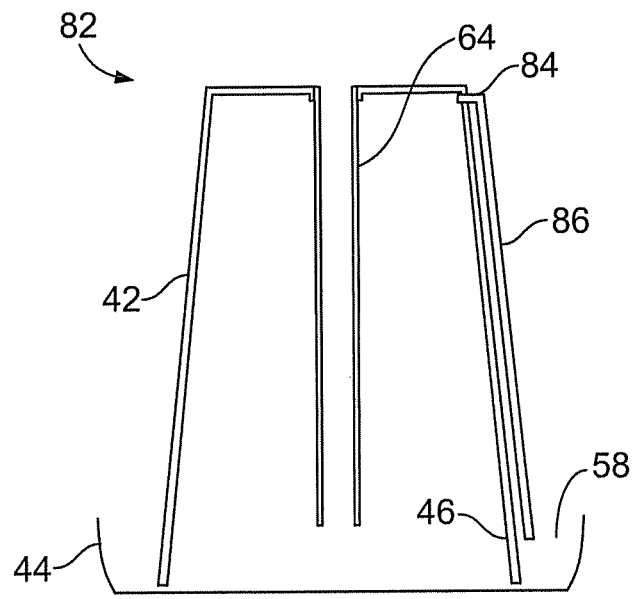
FIG. 5 illustrates a transverse cross-sectional view of a watering device, according to an embodiment of the present invention.

FIG. 5 illustrates a transverse cross-sectional view of a watering device 82, according to an embodiment of the present invention. The watering device 82 is the same as the device 40 shown in FIG. 3, except that, instead of the air valve 70, an air valve 84 includes a tube 86 that connects to the upper part of the reservoir 42 and passes into the drinking trough 58 outside the reservoir 42 at a point that is lower than the normal water level in the drinking trough 58. The air valve 84 allows air to escape by bubbling out through the drinking trough 58 during filling while the water in the drinking trough 58 seals off the opening to prevent air from back-flowing into the reservoir 42 during normal operation.

The tube 86 acts as a one-way air valve. During the filling process, water poured into the fill tube 64 flows into the reservoir 42 thereby forcing air out of the tube 86. Because the water level in the drinking trough 58 is lower than the water level in the fill tube 64 during filling, the air pressure inside the reservoir 42 is greater than the air pressure at the drinking trough 58, and excess air inside the reservoir 42 bubbles out through the drinking trough 58.

Once filling is completed, the equalization of pressures between the reservoir 42 and the drinking trough 58 cause water to be sucked from the drinking trough 58 into the tube 86 to the height of the water in the reservoir 42. Thus, the tube 86 also acts as a level indicator for the water level in the reservoir 42. The water in the tube 86 passes into the drinking trough 58 in the same manner as the water in the reservoir 42. If the reservoir 42 itself is made of a transparent or translucent material, there is no need to have the tube 86 function as a water level indicator. In that case, it is desirable to run the tube 86 down along the inner surface of the reservoir 42 and pass into the drinking trough 58 at a point below the normal water level in the drinking trough 58. In this manner, should a leak develop at the point where the tube 86 passes through the wall 46 of the reservoir 42, the leak would not allow air to enter and disrupt the normal operation.

Figure 6:
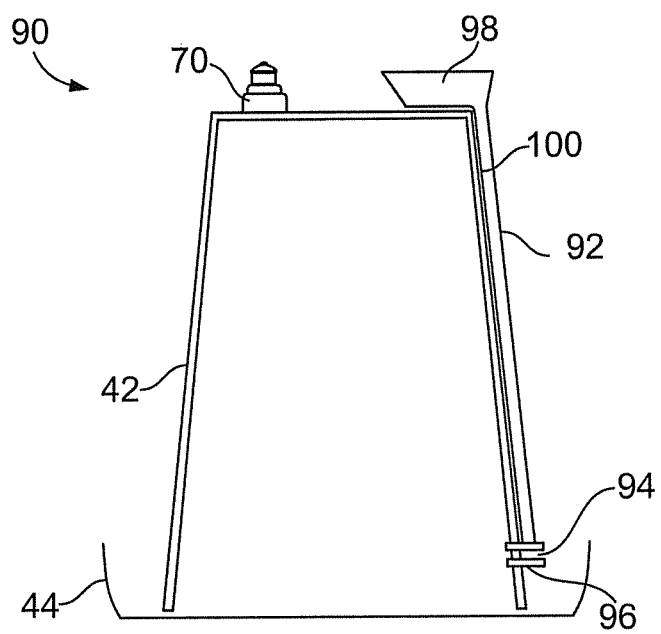
FIG. 6 illustrates a transverse cross-sectional view of a watering device, according to an embodiment of the present invention.

FIG. 6 illustrates a transverse cross-sectional view of a watering device 90, according to an embodiment of the present invention. The device 90 is similar to the device 40 shown and described with respect to FIG. 3, except that a fill tube 92 is positioned outside the reservoir 42 and enters the interior of the reservoir 42 though an air-tight seal at any point as long as an outlet 94 of the fill tube 92 is positioned at, or below, the desired water level in the drinking trough 58. As shown in FIG. 6, the outlet 94 of the fill tube 92 and a water valve 96 are located at the same position. The water valve 96 may be a flapper valve. The in-rush of water that is poured into the fill tube 92 at an upper funnel 98 closes the water valve 96, thereby directing the added water into the reservoir 42 through an opening 100, which may be located at any position along the fill tube 92 above the outlet 94. The water valve 96 may be formed of a material less dense than water so that once the in-rush of water stops, the buoyancy of the flapper valve 96 causes it to rotate upward to open the valve.

Any of the embodiments shown in described in FIGS. 3-6 may be used in combination with one another. For example, the valve/link configuration shown in FIG. 4 may be used with the fill tube configuration shown in FIG. 6. Also, the air valve configuration shown in FIG. 5 may be used in lieu of the air valve 70 shown in FIGS. 3, 4, and 6.

Embodiments of the present invention may be used in conjunction with the heating system and method shown and described in U.S. application Ser. No. 12/695,344, filed Jan. 28, 2010, entitled "System and Method for Heating a Poultry Watering Device," assigned to Allied Precision Industries Inc., which is hereby incorporated by reference in its entirety.

Thus, embodiments of the present invention provide a watering device that provides a number of advantages over conventional watering devices, some of which are listed below.

First, because there is no lid for top-filling the reservoir, no air leak can develop due to a lid gasket drying out. Unlike conventional top-filling devices, the reservoir of embodiments of the present may be nested within another reservoir, thereby reducing shipping costs.

Next, embodiments of the present invention provide a water seal along the base of the reservoir thereby negating the need for a bottle-shaped reservoir. Thus, the reservoir may be shaped as a tapered cylinder, thereby allowing multiple reservoirs to be nested for shipping, which significantly lowers shipping costs.

Also, because the water passage at the lower edge of the reservoir is no longer needed to define the height of water in the drinking trough, the reservoir may be lowered with respect to the basin thereby reducing the overall height of the device, which again results in lower shipping costs. By positioning the reservoir lower in the basin, the water in the lower portion of the reservoir is separated from the water in the drinking trough by the wall of reservoir, thereby increasing heat flow between the reservoir and the drinking trough to protect against freezing at low temperatures.

Because the lower end of the fill tube may be used to define the water level in the drinking trough, the water passage from the reservoir to the drinking trough may be protected by a filter to prevent back-flow of contaminants into the reservoir.

Unlike conventional designs, there is no need to detach any lid or cover from the unit during filling where the detached part could be set down on an unclean surface.

Additionally, hose connector attachments may be used for ease of filling with a garden or supply hose.

Further, the probability of spilling water during the filling process is significantly reduced. Also, the filling process is significantly faster than with conventional devices because the fill tube may be covered only by a dust cover that can be raised for filling. The dust cover may be linked to the water valve thereby negating the need to separately close off the water passage between the reservoir and the drinking trough during filling.

Additionally, failed valves may be easily replaced by the user.

Also, the air tube may serve as a water level indicator during normal operation.

While various spatial terms, such as upper, bottom, lower, mid, lateral, horizontal, vertical, and the like may be used to describe embodiments of the present invention, it is understood that such terms are merely used with respect to the orientations shown in the drawings. The orientations may be inverted, rotated, or otherwise changed, such that an upper portion is a lower portion, and vice versa, horizontal becomes vertical, and the like.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiments disclosed, but that the invention will include all embodiments falling within the scope of the appended claims.

The invention claimed is:

1. A top-filling watering system configured to provide water to livestock, the system comprising:
   a water basin having an upstanding wall;
   a reservoir securely mounted to said water basin, wherein said reservoir comprises a top wall integrally formed with a circumferential wall defining an open end connected to an interior cavity defined between said top wall and said circumferential wall, wherein a filling opening is formed through said top wall, said filling opening configured to allow water to be filled into the interior cavity; and
   a dust cover connected to a water valve through a link, wherein said dust cover is positioned over said filling opening, wherein said dust cover is configured to be moved between an open position in which said filling opening is exposed, and a closed position in which said filling opening is covered, a water passage or channel is formed proximate a lower edge of said circumferential wall, wherein said water valve is a flapper valve that closes a water passage or channel during a filling operation, and wherein said water valve opens said water passage or channel at times other than the filling operation.

2. The system of claim 1, wherein said reservoir is not a tank or a jug.

3. The system of claim 1, wherein said reservoir is devoid of a sealing lid.

4. The system of claim 1, further comprising a filling tube having an upper end connected to said filling opening, and a bottom end extending into said interior cavity below a level of a top lip of said upstanding wall.

5. The system of claim 1, wherein said water valve is operatively connected to said link that, in turn, connects to said dust cover positioned over said filling opening, wherein said dust cover is hinged.

6. The system of claim 1, further comprising an air valve positioned on or proximate said top wall.

7. The system of claim 6, wherein said air valve comprises a tube that connects to said water passage or channel formed through said circumferential wall.

8. A top-filling watering system configured to provide water to livestock, the system comprising:
a water basin having an upstanding wall;
a reservoir securely mounted to said water basin, wherein said reservoir comprises a top wall integrally formed with a circumferential wall defining an open end connected to an interior cavity defined between said top wall and said circumferential wall, wherein a filling opening is formed through said top wall, wherein a water passage or channel is formed proximate a lower edge of said circumferential wall, said filling opening configured to allow water to be filled into said interior cavity;
an air valve positioned on or proximate said top wall, wherein said air valve comprises a tube that connects to said water passage or channel formed through said circumferential wall; and
a filling tube having an upper end connected to said filling opening, and a bottom end extending into said interior cavity below a level of a top lip of said upstanding wall.

9. The system of claim 8, wherein said basin and said reservoir are integrally formed as a single unit.

10. The system of claim 8, wherein said filling tube is a flexible plastic tube configured to be coiled during shipping.

11. The system of claim 8, wherein said reservoir is not a tank or a jug.

12. The system of claim 8, wherein said reservoir is devoid of a sealing lid.

13. The system of claim 8, further comprising a water valve configured to selectively open and close said water passage or channel, wherein said water valve closes said water passage or channel during a filling operation, and wherein said water valve opens said water passage or channel at times other than the filling operation.

14. The system of claim 13, wherein said water valve is a flapper valve.

15. The system of claim 13, wherein said water valve is operatively connected to a link that, in turn, connects to a hinged cover positioned over said filling opening.

16. The system of claim 8, further comprising a dust cover connected to a water valve through a link, wherein said dust cover is positioned over said filling opening, wherein said dust cover is configured to be moved between an open position in which said opening is exposed, and a closed position in which said filling opening is covered.

17. The system of claim 8, further comprising a filter disposed within said water passage or channel.

18. A top-filling watering system configured to provide water to livestock, the system comprising:
a water basin having an upstanding wall;
a reservoir securely mounted to said water basin, wherein said reservoir is not a tank having a removable lid, wherein said reservoir comprises a top wall integrally formed with a circumferential wall defining an open end connected to an interior cavity defined between said top wall and said circumferential wall, wherein a filling opening is formed through said top wall, wherein a water passage or channel is formed proximate a lower edge of said circumferential wall, said filling opening configured to allow water to be filled into the interior cavity, wherein another reservoir is capable of nesting within said interior cavity before said reservoir is securely mounted to said basin;
an air valve positioned on or proximate said top wall;
a dust cover connected to a water valve through a link, wherein the dust cover is positioned over said filling opening, wherein said dust cover is configured to be moved between an open position in which said filling opening is exposed, and a closed position in which said filling opening is covered;
a filling tube having an upper end connected to said filling opening, and a bottom end extending into said interior cavity below a level of a top lip of said upstanding wall; and
said water valve configured to selectively open and close said water passage or channel, wherein said water valve closes said water passage or channel during a filling operation, and wherein said water valve opens said water passage or channel at times other than the filling operation.

19. The system of claim 18, wherein said basin and said reservoir are integrally formed as a single unit.

20. The system of claim 18, wherein said filling tube is a flexible plastic tube configured to be coiled during shipping.

21. The system of claim 18, wherein said water valve is a flapper valve.

22. The system of claim 18, wherein said water valve is operatively connected to a link that, in turn, connects to a hinged cover positioned over said filling opening.

23. The system of claim 18, wherein said air valve comprises a tube that connects to said water passage or channel formed through said circumferential wall.

24. The system of claim 18, further comprising a filter disposed within said water passage or channel.

25. A top-filling watering system configured to provide water to livestock, the system comprising:
a water basin having an upstanding wall;
a reservoir securely mounted to said water basin, wherein said reservoir comprises a top wall integrally formed with a circumferential wall defining an open end connected to an interior cavity defined between said top wall and said circumferential wall, wherein a filling opening is formed through said top wall, wherein a water passage or channel is formed proximate a lower edge of said circumferential wall, said filling opening configured to allow water to be filled into said interior cavity;
an air valve positioned on or proximate said top wall;

a filling tube having an upper end connected to said filling opening, and a bottom end extending into said interior cavity below a level of a top lip of said upstanding wall; and a dust cover connected to a water valve through a link, wherein said dust cover is positioned over said filling opening, wherein said dust cover is configured to be moved between an open position in which said opening is exposed, and a closed position in which said filling opening is covered.

26. A top-filling watering system configured to provide water to livestock, the system comprising:

a water basin having an upstanding wall;

a reservoir securely mounted to said water basin, wherein said reservoir comprises a top wall integrally formed with a circumferential wall defining an open end connected to an interior cavity defined between said top wall and said circumferential wall, wherein a filling opening is formed through said top wall, said filling opening configured to allow water to be filled into the interior cavity;

a filling tube having an upper end connected to said filling opening, and a bottom end extending into said interior cavity below a level of a top lip of said upstanding wall; and a dust cover connected to a water valve through a link, wherein said dust cover is positioned over said filling opening, wherein said dust cover is configured to be moved between an open position in which said filling opening is exposed, and a closed position in which said filling opening is covered.

27. A top-filling watering system configured to provide water to livestock, the system comprising:

a water basin having an upstanding wall;

a reservoir securely mounted to said water basin, wherein said reservoir comprises a top wall integrally formed with a circumferential wall defining an open end connected to an interior cavity defined between said top wall and said circumferential wall, wherein a filling opening is formed through said top wall, said filling opening configured to allow water to be filled into the interior cavity;

a water valve configured to selectively open and close a water passage or channel; and a hinged dust cover connected to said water valve through a link, wherein said hinged dust cover is positioned over said filling opening, wherein said hinged dust cover is configured to be moved between an open position in which said filling opening is exposed, and a closed position in which said filling opening is covered, wherein said water valve is operatively connected to said link that, in turn, connects to said hinged dust cover positioned over said filling opening, and wherein said water valve closes said water passage or channel during a filling operation, and wherein said water valve opens said water passage or channel at times other than the filling operation.

28. A top-filling watering system configured to provide water to livestock, the system comprising:

a water basin having an upstanding wall;

a reservoir securely mounted to said water basin, wherein said reservoir comprises a top wall integrally formed with a circumferential wall defining an open end connected to an interior cavity defined between said top wall and said circumferential wall, wherein a filling opening is formed through said top wall, said filling opening configured to allow water to be filled into the interior cavity;

an air valve positioned on or proximate said top wall, wherein said air valve comprises a tube that connects to a water passage or channel formed through said circumferential wall near a lower edge; and a dust cover connected to a water valve through a link, wherein said dust cover is positioned over said filling opening, wherein said dust cover is configured to be moved between an open position in which said filling opening is exposed, and a closed position in which said filling opening is covered.

* * * * *